United States Patent [19]

Vogelsberg

[11] 3,715,573

[45] Feb. 6, 1973

[54] FAILURE ACTIVITY DETERMINATION TECHNIQUE IN FAULT SIMULATION

[75] Inventor: Robert E. Vogelsberg, Nichols, N.Y.

[73] Assignee: International Business Machines Corporation, Armonk, N.Y.

[22] Filed: April 14, 1971

[21] Appl. No.: 133,999

[52] U.S. Cl. ..............235/153 AC, 340/172.5, 444/1

[51] Int. Cl. ..............G06f 11/00

[58] Field of Search..340/146.1, 172.5; 235/153 AC, 235/153 AK; 441/1

[56] References Cited

UNITED STATES PATENTS

| | | | |
|---|---|---|---|
| 3,377,471 | 4/1968 | Althaus et al. | 235/153 |
| 3,517,171 | 6/1970 | Avizienis | 235/153 |
| 3,519,808 | 7/1970 | Lawder | 235/153 |

OTHER PUBLICATIONS

Perry & Symonds, Testing Error Recovery Procedures, IBM Technical Disclosure Bulletin, Vol. 13, No. 8, January 1971.

Schlemmer, Tester Programmed by Responses of Test Devices to Prior Interrogation, IBM Tech. Discl. Bulletin, Vol. 14, No. 5.

*Primary Examiner*—Charles E. Atkinson
*Attorney*—Hanifin and Jancin and John C. Black

[57] ABSTRACT

The failure activity determination technique of the present application represents a new approach to fault simulation designed to significantly reduce the time required to perform such simulations. This new technique may be used in conjunction with any interpretive fault simulation program (i.e., any program using list structures to trace and calculate circuit activity in a logic design). The improved technique consists essentially of using previously calculated good machine values during the fault simulation for any logic blocks that are not effected by the failure(s) being simulated. Thus, new values must be calculated for only a subset of the total logic circuitry. This subset, or failure partition, of the logic is determined dynamically during the fault simulation through the use of a series of flags within the circuit list structure.

5 Claims, 8 Drawing Figures

INVENTOR
ROBERT E. VOGELSBERG

BY John C Black
ATTORNEY

CIRCUIT DESCRIPTION 13

| | |
|---|---|
| BLOCK 1 | BLOCK 1, INPUT 1 IS PI-A<br>BLOCK 1, INPUT 2 IS PI-B<br>AND-BLOCK 1, VALUES, FLAGS<br>BLOCK 1, OUTPUT 1 IS TO BLOCK 4 |
| BLOCK 2 | BLOCK 2, INPUT 1 IS PI-B<br>BLOCK 2, INPUT 2 IS PI-C<br>AND-BLOCK 2, VALUES, FLAGS<br>BLOCK 2, OUTPUT 1 IS TO BLOCK 4 |
| BLOCK 3 | BLOCK 3, INPUT 1 IS PI-D<br>BLOCK 3, INPUT 2 IS BLOCK 4<br>AND-BLOCK 3, VALUES, FLAGS<br>BLOCK 3, OUTPUT 1 IS TO BLOCK 4 |
| BLOCK 4 | BLOCK 4, INPUT 1 IS BLOCK 1<br>BLOCK 4, INPUT 2 IS BLOCK 2<br>BLOCK 4, INPUT 3 IS BLOCK 3<br>OR-BLOCK 4, VALUES, FLAGS<br>BLOCK 4, OUTPUT 1 IS TO BLOCK 5<br>BLOCK 4, OUTPUT 2 IS TO BLOCK 3 |
| BLOCK 5 | BLOCK 5, INPUT 1 IS BLOCK 4<br>BLOCK 5, INPUT 2 IS PI-E<br>AND-BLOCK 5, VALUES, FLAGS<br>BLOCK 5, OUTPUT 1 IS PO |
| PI-A | PI-A, VALUES, FLAGS<br>PI-A GOES TO BLOCK 1 |
| PI-B | PI-B, VALUES, FLAGS<br>PI-B GOES TO BLOCK 1<br>PI-B GOES TO BLOCK 2 |
| PI-C | PI-C, VALUES, FLAGS<br>PI-C GOES TO BLOCK 2 |
| PI-D | PI-D, VALUES, FLAGS<br>PI-D GOES TO BLOCK 3 |
| PI-E | PI-E, VALUES, FLAGS<br>PI-E GOES TO BLOCK 5 |
| PO-BLOCK | PO BLOCK ENTRY |

FIG. 2

AET 14

| |
|---|
| TIME 1<br>STIMULUS<br>PI-A → 0<br>PI-B → 0<br>PI-C → 0<br>PI-D → 0<br>PI-E → 0<br>TIME 2<br>STIMULUS<br>BLOCK 1 → 0<br>BLOCK 2 → 0<br>BLOCK 3 → 0<br>BLOCK 5 → 0<br>TIME 3<br>STIMULUS<br>BLOCK 4 → 0<br>TIME 4<br>STIMULUS<br>PI-B → 1<br>PI-D → 1<br>TIME 8<br>STIMULUS<br>PI-B → 0<br>PI-E → 1<br>TIME 10<br>COMPARE<br>PO = 0?<br>STIMULUS<br>PI-D → 0<br>PI-E → 0 |

FIG. 3

| BLOCK | T0 | T1 | T2 | T3 | T4 | T5 | T6 | T7 | T8 | T9 | T10 | T11 | T12 | T13 | FINAL STATUS |
|---|---|---|---|---|---|---|---|---|---|---|---|---|---|---|---|
| A | X/fi | 0/fi | | | | | | | | | | | | | 0/fi |
| B | X/fi | 0/fi | | | 1/fi | | | | 0/fi | | | | | | 0/fi |
| C | X | 0 | | | | | | | | | | | | | 0 |
| D | X | 0 | | | 1 | | | 1/fi | | | 0/fi | | | | 0/fi |
| E | X | 0 | | | | | | 0/fi | 1/fi | | 0/fi | | | | 0/fi |
| 1 | X/fs | | 0/fs | | | 1/fp | | | | 0/fs | 0/fsfi | | | | 0/fifs |
| 2 | X | | 0 | | | | 0/fi | | | | | | | | 0/fi |
| 3 | X | | 0 | | | | 0/fi | 1/fp | | | | 0/fs | | 0 | 0 |
| 4 | X | | | 0 | | | 1/fp | | | | | | 0 | | 0 |
| 5 | X | | 0 | | | | | 0/fs | | 1/fp | | 0/fs | | 0 | 0 |

| TIME | STACK 60 FUNCTION ENTRIES | STACK 61 FUNCTION ENTRIES |
|---|---|---|
| T1 | NEXT 1 | CALCULATE |
| T2 | CALCULATE 1 | NEXT |
| T3 | NEXT | CALCULATE |
| T4 | CALCULATE | NEXT 1 |
| T5 | NEXT 4 | CALCULATE 1 |
| T6 | CALCULATE 4 | NEXT 3,5 |
| T7 | NEXT 4 | CALCULATE 3,5 |
| T8 | CALCULATE 4 | NEXT 1,5 |
| T9 | NEXT 4 | CALCULATE 1,5 |
| T10 | CALCULATE 4 | NEXT 3,5 |
| T11 | NEXT 4 | CALCULATE 3,5 |
| T12 | CALCULATE 4 | NEXT 3,5 |
| T13 | NEXT | CALCULATE 3,5 |

FIG. 7

FAILURE ACTIVITY DETERMINATION TECHNIQUE IN FAULT SIMULATION

BACKGROUND OF THE INVENTION

1. Field of the Invention

Fault simulation is a vital component in the development of effective maintenance packages for central processing units, input-output control units, and similar logic devices of data processing systems. Fault simulation is used to verify the effectiveness of diagnostic programs (the prime service aids for electronic units) and to prepare the failure data required by these programs. In the past, the large amount of computer time required for complete coverage of all possible faults has limited the applications of fault simulation. Physical fault simulation and several forms of compiled and interpretive programmed fault simulation have been used in efforts to minimize running time. The new failure activity determination technique of the present application represents a new approach to programmed fault simulation designed to significantly reduce the time required to perform the simulation. The technique may be used in conjunction with any interpretive fault simulation program and has been implemented in a three-valued unit-delay simulation system. The central processing unit of an intermediate system, such as the System/370 Model 145, marketed by International Business Machines Corporation, can be fault simulated with the new technique with an increase in running speed of at least an order of magnitude when compared to other known programmed fault simulation techniques.

The major contribution to the system downtime for complex electronic systems is the time required by a customer engineer to identify the failing circuit. The time required to repair the failure is usually less than 10 percent of the total time spent on a service call. The prime consideration in the service philosophy of electronic systems is the provision of service aids that will allow quick and accurate diagnosis of a failure to a field replaceable unit. Such a capability is provided through the use of diagnostic programs which are manually generated test sequences designed to detect and isolate every single solid failure that may occur within the system. The effectiveness of the diagnostic programs determines the overall effectiveness of the system maintenance package. It is at this point that fault simulation becomes important.

Fault simulation serves two major purposes during the development of diagnostic programs. Initially, it is used to determine the coverage and resolution of the diagnostic (i.e., the number of the failures detected, and the level at which failures may be distinguished from each other). This data is used by the diagnostic programmers to improve the programs. The process is continued until a satisfactory level of effectiveness is reached. Fault simulation is then used to prepare the failure documentation that will be used in the field by the customer engineer. For each possible failure, the response of the system is determined and entered in the failure documentation. This data must be accurate. Incorrect or incomplete failure documentation leads to low customer engineer confidence in the diagnostic package. This, in turn, leads the customer engineer to ignore the diagnostics. The vicious cycle thus established rapidly negates any potential gains in maintenance effectiveness that might have been provided by the diagnostic programs.

Early known diagnostic programs for computers were primarily functional tests. Failure documentation, when it existed, was manually prepared and notoriously inaccurate. As a result, the customer engineer was required to diagnose and isolate system failures independent of automated procedures. The tools used were an oscilloscope and the system ALD's (Automated Logic Diagrams). A major service procedure was the substitution of identical logic cards (from the system or a stock of spares) to identify the failing unit. These approaches will not be adequate for future generations of computers. System complexity is increasing, while customer engineering skill levels are decreasing. Functional packaging of logic is reducing the number of duplicate cards in a given system, burying previously observable nodes, and making on-site spare stocking economically infeasible. A reduced customer tolerance of down-time (especially in time-sharing and real-time operations) serves to accentuate the effects of these trends. The effectiveness of automated diagnostic procedures must be increased if acceptable levels of system maintenance are to be realized. Fault simulation can be instrumental in providing the required improvements to diagnostic programs.

2. Description of the Prior Art

In the past, the large amount of computer time required for coverage of all failures has limited the applications of fault simulation. A temporary solution to the running time problem was provided through physical fault simulation. During physical fault simulation, a hardware model of the completed machine is procured and failures are simulated by connecting the input and output pins of the logic cards to voltages corresponding to logical 1 and logical 0

Early versions of physical fault simulation were completely manual in operation. A card was removed from the machine, a switch was inserted to connect an input or output pin to a constant voltage, the machine diagnostic was run, and the point at which the diagnostic stopped was noted. The data generated in this manner formed the final failure documentation.

A later version of physical fault simulation utilized the same general approach, but it automated the applications of failures to reduce the time required for the simulation. A controlling computer was connected to the system (a computer) which was being fault simulated through a channel attachment. The control system selected a card to be tested, initiated the execution of the diagnostic programs for every input or output pin failure of the card, and recorded the resulting failure data. The only manual step in the process was the insertion of a special channel attachment between the card being failed and the gate. This reduced fault simulation running time by a factor of 50.

Physical fault simulation, because it can be done at hardware speeds, offers a running time advantage over most program simulation techniques. An obvious disadvantage of the approach is the requirement that an operational hardware model of the system to be fault simulated be available. If such a model is available, and if the technology will allow it, physical fault simulation is a useful tool in the development and documentation of diagnostic programs.

Unfortunately, next-generation systems will not permit physical fault simulation. Several major difficulties exist. New circuit technologies will not operate when attempts are made to physically insert failures. Timing and loading constraints make the use of card extenders and other required system modifications impossible. The functional packaging approaches being used make failure coverage through the faulting of card pins low. In a functional package, most logic failures are internal to a card and cannot be adequately represented as a constant level at an input or output pin. For these reasons, the fault simulation of next-generation systems must be done with program simulation techniques.

Two distinct known approaches to program simulation exist. The first of these is compiled fault simulation. A compiled simulation operates in two passes. The first pass consists of an analysis of the machine logic description, which is usually contained in a design automation file in terms of circuit interconnections and functions. The result of this analysis stage is a list of compiled code corresponding to the logic functions performed by the hardware. For example, an AND circuit might cause instructions to be generated in order to logically AND the storage locations corresponding to its input values, and then store the result in the location corresponding to its output value. If failures are to be applied to the AND circuit, appropriate modifications are made to the compiled code. When the logic circuitry to be simulated is sequential in nature, the analysis program identifies feedback loops. The circuit is then made combinational by opening the feedback loops and making them inputs and outputs of the circuit. During the second pass of the compiled simulation, a set of input changes is applied to the primary inputs and the compiled code is executed repetitively until stability is reached (the primary inputs and outputs corresponding to the feedback loops agree), or until some maximum number of passes have been made.

The computer time required for compiled fault simulation increases rapidly as the size and complexity of the system to be simulated increases. A number of techniques can be applied to reduce the simulation running time. The structure of programmed simulation (unlike physical simulation) allows more than one failure to be simulated during each execution of the compiled code. In one program, it was common to simulate thirty-five independent failure environments during each pass. This reduced total simulation time by a factor of thirty-five. In any circuit, certain failures were logically indistinguishable from other failures (e.g. the input failures of an AND circuit corresponding to stuck at logical 0 are identical in behavior to the output failure corresponding to stuck at logical 0). The elimination of these failures from the set of simulated failures reduces the simulation running time by one-third. For many test applications, the first detection of a failure is sufficient to isolate the failure. Whenever the simulation of each failure is stopped, upon the failure being detected, running time is further reduced in one instance by a factor of three. Together these techniques lead to a significant reduction of total simulation running time (by a factor of about one hundred fifty for one simulation).

Despite these gains, the rapid growth in size and complexity of the computer systems requiring fault simulation soon made fault simulation with compiled simulators economically infeasible. Interpretive fault simulation techniques were developed to further reduce simulation running time.

In most logic designs, any one set of primary input changes will cause only a small proportion of the total circuitry to change state (usually less than 10 percent). For each set of input changes, a compiled simulator executes all the compiled (e.g. until stability is reached. Thus, every circuit in the system will have its value computed several times.

An interpretive simulator attempts to avoid most of these calculations by simulating only those logic circuits that might be affected by a given set of input changes. The technique is usually referred to as significant event simulation event simulation.

The interpretive simulator operates with a circuit list or circuit table structure that represents the interconnections and logic functions of the machine being simulated or modeled. One or more failures are applied to this model by modifying the machine description, and then a set of input changes is applied. The simulator calculates the response of the model to the inputs on the significant event basis. Only logic circuits to which an input level changes are calculated. The results of each calculation are propagated and cause other circuits to be calculated only if the new circuit value is different from the old value. This operation is continued until no new calculations are required.

A zero-delay, three-value interpretive fault simulator, used to fault simulate logic cards, incorporated an innovation in the calculation of logic circuit values. Three-values are used in the calculations instead of the usual two. In addition to the binary 1 and 0 values, the simulator uses an X value. This value represents an unknown condition and is considered to occur during any transition from one binary value to another. The X value is also used to represent initially unspecified conditions or don't-care input levels. The use of the third value, in conjunction with the zero-delay timing framework of the simulator (all changes are considered to occur simultaneously and are propogated to stability), allows the detection of combinational hazards, critical races, and feedback oscillations. The third-value proved to be such a valuable tool that subsequent fault simulators based on the original simulators continued its use despite a resulting reduction in running speed.

A major advantage of interpretive simulations is the versatility in circuit analysis offered by the tabular description of the logic circuit. In particular, several techniques have been developed which use the circuit description and non-failure machine simulation result to eliminate the need to simulate some failures. Such techniques are referred to as fault screening. One fault screen for use with one known two-value unit delay simulation system, operates by performing a backtrace from the primary outputs of the circuit to be fault simulated. During the backtrace, a summation of the non-failure machine activity for a given test series is used to determine which failure should be simulated for the test series. Essentially, failures are eliminated whenever a logic value (1 or 0) that has not changed during the test series prevents the effect of the failure from propagating to an output. The fault screen is thus most effective when a small amount of logic activity exists during a test series for which known initial conditions may be specified.

SUMMARY OF THE INVENTION

The failure activity determination technique of the present invention is the latest known effort to reduce fault simulation running time. Conceptually, the technique may be considered to apply the idea of significant events simulation to fault simulation. As noted previously, any set of input changes to a logic circuit affects only a fraction of the logic in the circuit. Interpretive simulators take advantage of this fact to gain a running speed advantage over compiled simulators. A similar phenomenon exists during fault simulation. Any given failure affects only a small fraction of the logic circuit being simulated. During fault simulation, most of the logic activity is identical to the activity of non-failure or good machine simulation. The failure activity determination technique makes use of this fact.

The failure activity determination technique consists essentially of using previously calculated good machine values during the fault simulation for any logic blocks that are not affected by the failures being simulated. New values are calculated for only the subset of the logic being simulated that may be affected by a failure. This subset, or failure partition, is determined dynamically during the fault simulation through the use of a series of flags within the circuit table structure. The values of the remainder of the logic are maintained (updated) from a list of good machine simulation results.

The failure activity determination technique has a reduced running time in comparison to other simulation techniques for several reasons. First a logic value may be updated from the good machine results in about one-tenth the time required to calculate the value. In a typical simulator, ten instructions are required to perform an update of a logic value, and an average of one hundred instructions are required to calculate a logic value. Secondly, only changes in logic values require that updates be made. During a good machine simulation, an average of two to three logic circuits are calculated for each logic circuit that changes value. Thus, a fault simulation using the failure activity determination technique can usually run 20 to 30 times as fast as a good machine simulation. Such gains can be realized for failures that affect only a small percentage of the total circuit. Failures that affect most of the circuitry require that calculations be made for that circuitry. In such cases, the failure activity determination technique reduces to normal fault simulation. It should be noted that the failures which affect most of the logic are usually detected early in a test sequence and therefore account for only a small percentage of the total fault simulation running time.

The failure activity determination technique operates in two stages. The first stage is a good machine simulation. During this stage, the logic circuit to be fault simulated is first simulated without any failures to determine the non-failing machine logic activity for the given test sequence. A record of every logic value change and the circuit being changed is saved on an All Events Trace (AET).

The second stage in the operation of the technique is the fault simulation cycle which is executed repetitively until all desired failures have been processed. During this cycle, a failure (or a group of failures) is applied to the logic circuit, the initial effects of the failure are propagated, and fault simulation is begun. The fault simulation consists of reading a good machine logic value change from the AET and either updating a circuit value table, or calculating a logic block in the failure partition. During the simulation, three flags are used to determine the failure partition: a "failure input" flag (*fi*), a "failure sensitive" flag (*fs*), and a "-failure propagation" flag (*fp*). These flags are defined as follows:

*fs:* If a failure value is propagated to a logic block during the simulation but does not pass through it, the block is flagged as a failure sensitive block. Such blocks represent the forward boundary of the failure partition.

*fp:* If a failure value is propagated through a logic block during the simulation, the block is flagged as a failure propagation block. Such blocks represent the interior of the failure partition.

*fi:* If a block is an input to a fs or fp block, it is flagged as a failure input block. A block can be both an fs and an fi block, but fp blocks are not flagged as fi blocks. Such blocks represent the inputs to the failure partition.

As the AET is read during the fault simulation, the subsequent simulator action is determined by the flags associated with the logic block being changed.

If the block has no flags, the circuit value table is updated, and the next AET entry is read.

AET changes to *fs* or *fp* blocks are ignored.

AET changes to *fi* blocks cause the circuit value table to be updated and the values of the *fp* and *fs* blocks fed by the *fi* block to be calculated.

If the block fed is an *fs* block, the calculated value is checked to see if it is different from the good machine value. If it is, the fs block is changed to an *fp* block, and the blocks it feeds are calculated (these blocks become fs or fp blocks, and their inputs become *fi* blocks).

If the value calculated for the *fs* block is identical to the good machine value and none of its input blocks have *fp* flags, the block *fs* flag and the *fi* flags on its input are removed.

If the new value represents a change, the effects of the change are propagated.

If the block fed is an *fp* block, the calculated value is checked to see if it is the same as the good machine value. If it is, the *fp* block is changed to an *fs* and *fi* block. (It is an *fi* block because it feeds fs or *fp* blocks.)

If the calculated value is different from the good machine and different from the previous failure machine, the blocks fed by the *fp* block are calculated for the new input value.

This process is continued until the time is reached at which the circuit outputs are observed. Any failures detected by the test may then be removed from the circuit. The simulation is continued until all failures have been detected or the test sequence is completed.

BRIEF DESCRIPTION OF THE DRAWINGS

FIGS. 2 and 3, respectively, illustrate one example of an interpretive program circuit description and an all events trace output from a non-failing machine simulation;

FIG. 7 shows the logic data in the calculate/next stacks at various times during fault simulation of the circuit of FIG. 5.

DESCRIPTION OF THE PREFERRED EMBODIMENT

Figures 1, 1A:
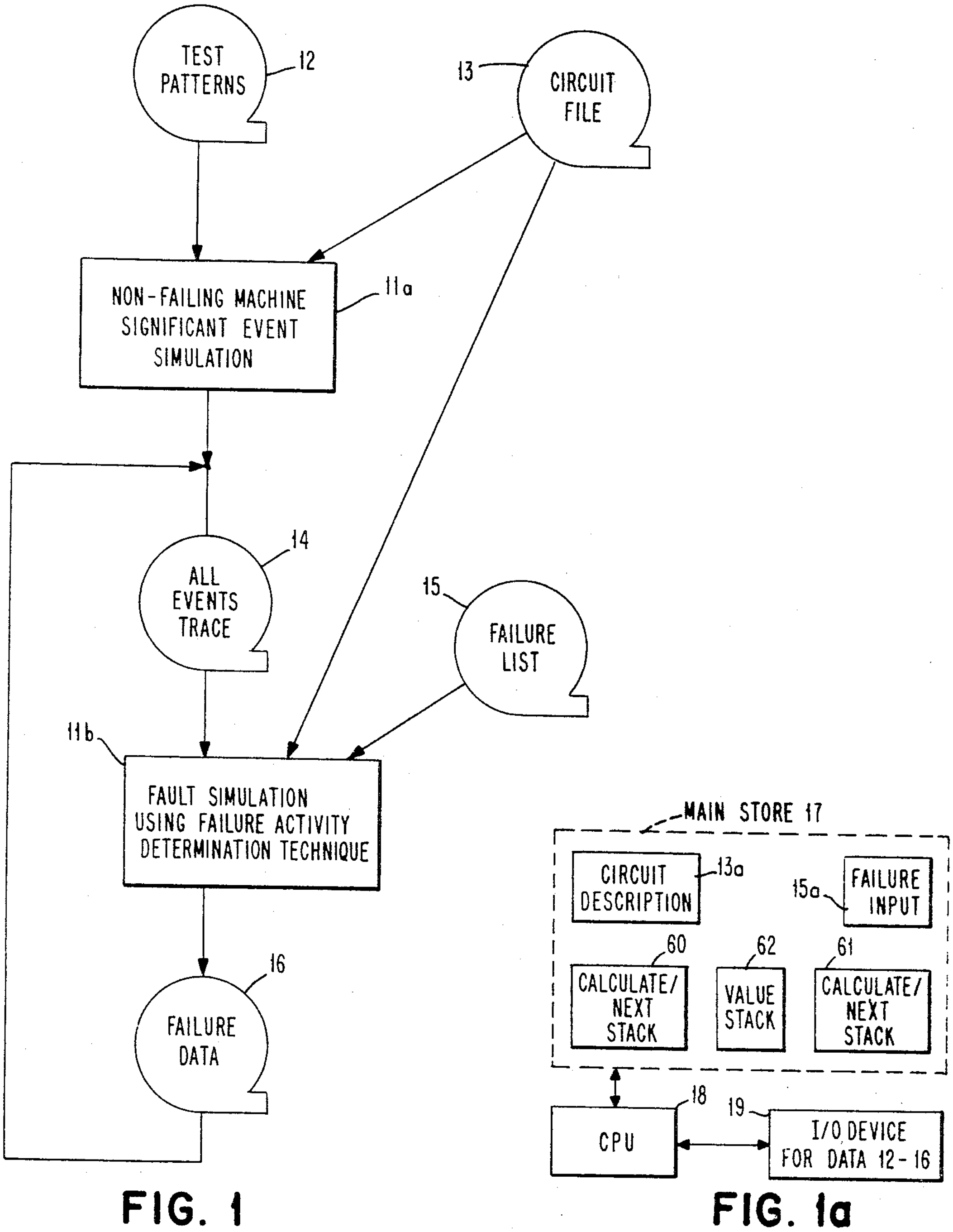
FIGS. 1 and 1a diagrammatically illustrate the improved fault simulation program and a processing system for executing the program.

FIGS. 1 and 1a diagrammatically illustrate the improved fault simulation which can be implemented on any general purpose processor 18 having adequate main storage capacity 17 to store the simulation data, arithmetic and logic processing capacity to make the various computations and tests and suitable input-output devices 19 for storing test patterns 12, circuit descriptions 13, failure lists 15, and an All Events Trace (AET) 14 and failure data 16 from which diagnostic routines can be prepared.

In FIG. 1, it is assumed by way of example that the non-failing machine simulation program **11*a* and the fault simulation program 11*b* are performed on a processor 18** generally of the type described in U.S. Pat. No. 3,400,371, issued Sept. 3, 1968, to Amdahl, et. al., and manufactured by International Business Machines Corporation, e.g. a System/360 Model 40. Suitable program instructions for performing the improved algorithm of the present application can be prepared by one of average skill in the art without the exercise of invention.

One set of suitable program instructions is the System 360 Operating System (OS) available from International Business Machines Corporation. The following list of logic manuals describe the components of OS and are also available from International Business Machines Corporation by contacting the IBM Systems Development Division, Product Publications, Department 398, P. O. Box 390, Poughkeepsie, New York 12602:

| Title | Form No. |
|---|---|
| Assembler (64K) | Y26-3700 |
| Control Program with Option 2 | Y27-7128 |
| Sequential Access Methods | Y28-6604 |
| Catalog Management | Y28-6606 |
| Direct Access Device Space Management | Y28-6607 |
| Input/Output Support (OPEN/CLOSE/EOV) | Y28-6609 |
| Input/Output Supervisor | Y28-6616 |
| Basic Direct Access Method | Y28-6617 |
| Indexed Sequential Access Methods | Y28-6618 |
| Linkage Editor | Y28-6610 |
| Utilities Program | Y28-6614 |
| Update Analysis Program | Y28-7106 |
| Sort/Merge | Y28-6597 |
| Introduction to Control | Y28-6605 |
| Fixed-Task Supervisor | Y28-6612 |
| Job Management | Y28-6613 |
| MVT Control Program Logic Summary | Y28-6658 |
| MVT Supervisor | Y28-6659 |
| MVT Job Management | Y28-6660 |
| Initial Program Loader and Nucleus Initialization Program | Y28-6661 |

In the preferred embodiment, the test patterns 12, the circuit file 13, the AET 14, the failure list 15 and the failure data 16 are contained on magnetic tape devices 19 and transferred to and from the processor 18 by conventional tape control units (not shown) in a well-known manner.

FIG. 1 illustrates the manner in which the test patterns 12 and the circuit description 13 are fed into a non-failing machine simulation 11a program to produce the AET 14 which will then be used to drive the fault simulation program **11*b*. The non-failing machine simulation operates by loading the circuit description 13 into the main storage unit 17 of the central processor 18 reading the first of the test patterns 12, applying the changes represented by that test pattern to the inputs of the system to be simulated. The simulation then proceeds by calculating the changes in circuit values caused by these input patterns. For each change in input value and each change in circuit value, an entry is made in the AET 14 indicating which logic block changed and its new value. Entries are also made in the AET 14** indicating the time at which each change takes place.

Part of the data contained on the test patterns 12 determines when the primary output values of the logic circuits being simulated are available to be observed for detecting potential errors; this data is entered into the AET to cause the fault simulation to make comparisons between the good (or non-failing) machine values and the failing machine values for detecting errors. The process of non-failing machine simulation 11a is continued until all the test patterns 12 in a given test series have been simulated. At the end of the non-failing machine simulation **11*a*, the AET 14** contains a record of every change that occurred within the non-failing machine simulation.

Indications are made on the AET 14 as to the times at which these changes occurred and the commands to the fault simulator to make non-failing versus failing machine comparisons at primary outputs.

Once the non-failing simulation **11*a* has been completed, it need not be repeated; and the AET 14 becomes the stimulus for the fault simulator 11*b* which utilizes the failure activity determination technique. The fault simulation 11b begins by loading the circuit description from the circuit file 13 into main storage area 13*a***.

The initial values (logical output values) of all logic blocks and all primary inputs are set to an unknown value X. The first failure to be simulated is selected from the list 15 (a list of all the failures to be simulated) and placed in main storage area **15*a*. The logic blocks and primary inputs affected by the failure value have an initial set of flags specified at this point. The fault simulation 11*b* proceeds by reading a first set of entries in the AET 14. During the reading of the AET 14, the changes contained thereon selectively update the circuit description values of portions of the circuit description 13 that have not been affected by the failure selected for simulation; those portions of description 13** which are affected by the failure (the failure partition) must have their new values calculated.

A series of flags within the circuit description are used to dynamically maintain a record of the logic elements affected by the failure. For these logic elements, logic value calculations and the propagation of the logic values are carried out in a manner similar to the non-failing machine simulation.

When commands occur on the AET 14 during fault simulation to cause the fault simulator 11*b* to compare a simulated value at a primary output to the expected value which the non-failing machine simulation had produced, the fault simulator checks to see if the simulated value is different from the expected value. If it is different, it indicates that the failure being simulated has caused the logic value to be different from non-failure machine value at a time when the output value is being monitored. Thus, the failure is detected. At this point, the failure may be eliminated from further fault simulation. Output data is produced at 16 describing the failure, the time at which it occurred and the erroneous value or values it caused.

The next failure is then selected from the failure list 15, values are re-initialized within the fault simulation 11*b* and the process is repeated, again reading the AET 14 from the next failure until the failure is detected or the end of the AET 14 is reached.

Figures 5, 6:
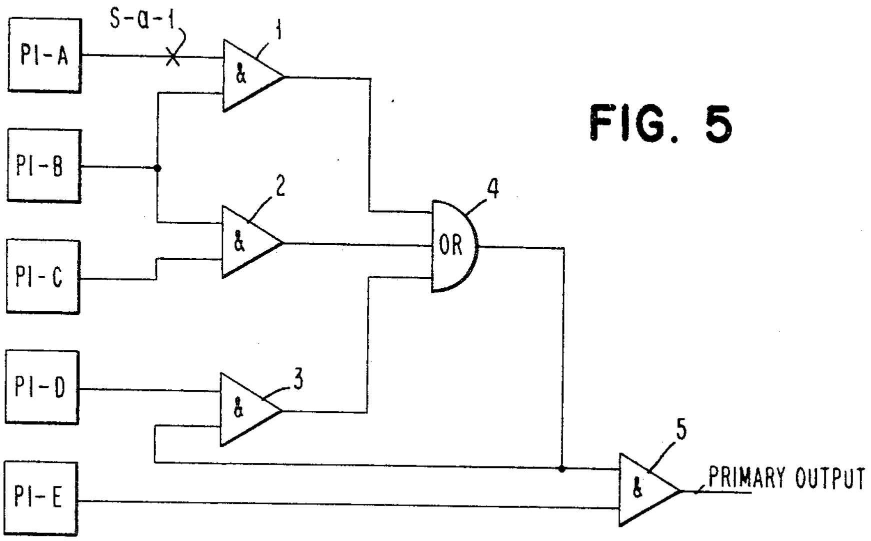
FIG. 5 is a logic diagram of the circuit being simulated in accordance with the circuit description of FIG. 2, the all events trace of FIG. 3 and a specific fault shown in FIG. 5.
FIG. 6 is a chart showing the values and flags for the input and logic blocks of the circuit of FIG. 5 at various time periods during fault simulation for the specific fault illustrated in FIG. 5.

The circuit description 13 of FIG. 2 is a list or table structure describing the input and logic blocks of FIG. 5. Thus, the block 1 entry of description 13 has storage areas designated for identifying the names and address locations of its two inputs A and B, its output to block 4 and its function, AND, and for storing its good machine and failing machine values and its failing machine flags *fi, fs, fp*. Symbolic representations are shown in the entries, but it will be appreciated that the data is recorded in machine readable form (e.g. binary) in an actual commercial embodiment.

Blocks 2–5 have similar input, output, function, value and flag entries; and input blocks A–E have output, value and flag entries.

Although the example shown assumes the execution of only one fault simulation at a time, it will be appreciated that in an actual commercial embodiment it will be necessary to achieve economy to run a large number of fault simulations simultaneously on complex circuits (e.g. 10,000 logic blocks) using the same AET 14 and circuit description 13. In such an embodiment, a space is allocated in description 13 for good and failing machine values for each fault being simultaneously simulated. A large processor can process, compute and compare a large plurality of binary bits (values and flags) simultaneously significantly reducing running time.

The AET 14 of FIG. 3 shows good machine change value entries for times T1, T2, T3, T4, T8 and T10. There are no entries on the AET for other time intervals. A compare entry appears at the beginning of the entries for time T10. The entries are shown in symbolic form; however, in a commercial embodiment, they will be in machine readable form.

Figure 4:
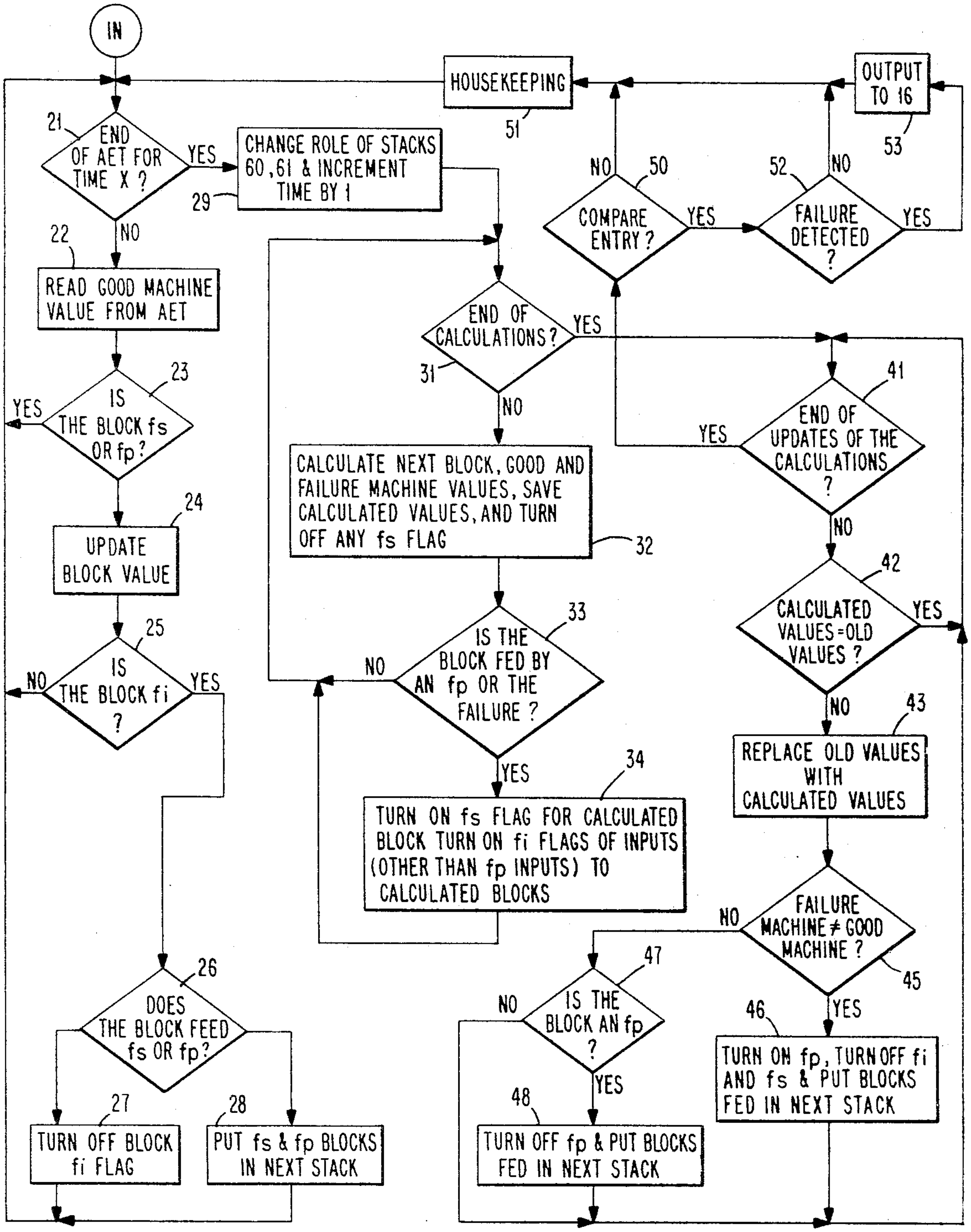
FIG. 4 is a flowchart illustrating the novel portion of the improved fault simulation program.

FIG. 4 is a flowchart illustrating the application of the failure activity determination technique to a three-value, unit-delay simulator program. The figure assumes that the circuit description 13 has previously been loaded into main store from an I-O device 19, that failure flags have been applied to the logic blocks of the circuit description initially affected by the failure selected from list 15 for simulation and that the routine begins with the reading of the first entries of the AET 14.

There are three major loops within the fault simulation program. Steps 21 through 29 detail the operations related to the reading of logic changes from the AET. Steps 31 through 34 detail the operations related to the calculation of values for those logic blocks affected by the selected failure. Steps 41–43 and 45–48 detail the operations related to the propagation of values for those logic blocks that have been affected by the failure.

Steps 50–53 illustrate the point within the processing at which housekeeping chores are done, comparisons of output values with expected values are made and the resulting failure data output is effected.

Returning to the first loop which details the reading of logic changes from the AET 14, step 21 calls for a decision—a check to see if all AET entries (value changes) for one time period have been read. If they have not, the next good machine value change or entry (primary input or logic block output) is read from the AET, step 22.

In step 23, the logic block or input block identification contained in the AET entry is used to enter (or address) the circuit description 13 and determine if the block is flagged as an *fs* or *fp* block. If it is, control returns to step 21 because the block is a member of the failure partition, and its value will be calculated later in the process. If the block is not an *fs* or *fp*, the new block value in the AET entry is entered into the circuit description 13 for the block, i.e. the value is updated, during step 24.

The block is then checked in step 25 to determine if it is an input to a failure partition, i.e. if it has an *fi* flag. If not, the processing of this AET entry is completed, and control returns to step 21. For most AET entries, this is the path exercised most often. If the block is an input to a failure partition (or rather was, at the last time it was considered, an input to a failure partition), a check is made at step 26 to determine if the block still is an input to the failure partition because subsequent changes in the logic could have changed its status. If the block feeds an fs or fp block, it is still an input to failure partition, and control is transferred to step 28 where the blocks fed by the entry block are placed in one of the stacks or working lists 60, 61 (FIG. 1) to be calculated during the next time interval. If the block is no longer an input to failure partition, its *fi* flag is turned off in step 27. In either event, control returns to step 21.

After each AET entry for a given time interval has been processed as described above, step 21 transfers to step 29 to increment the time period and reverse the function of stacks 60 and 61. Control is then transferred to step 31 to calculate the values of any blocks that have been entered into the "next" stack at step 28. At step 31, a check is made to determine if all calculations have been completed. If they have not, the first block in current calculating stack is retrieved from circuit description 13; the block's value (both good machine and failure machine) is calculated in step 32 as the boolean combination of its input values indicated by the block functions, its *fs* flag is turned off (if on) in circuit description 13, and the new value for the block is saved in a temporary value stack 62.

At step 33, a check is made to determine if the block just calculated in step 32 is fed by a block whose value has propagated a failure or by the failure itself. If it is not, control returns to step 31. If it is fed by an *fp* block, then the block just calculated must have at least one input value that is different from the good machine value because of the failure being simulated, and we turn on the failure sensitive flag *fs* for the block in step 34. In step 34, *fi* flags are turned on for the blocks feeding the block just calculated unless the *fp* flags are on. Control then returns to step 31.

When all blocks in the calculate stack have been calculated, control is transferred to step 41. The results of these calculations which were stored in a temporary value stack are used to update circuit description 13, and we determine whether or not changes have occurred that must be propagated further in the logic. Step 41 checks to determine if the values of all the blocks in the stack have been processed (updated). If not, the next block is processed. The calculated block value and the previous block value are compared. If they are the same, no change has occurred because of the calculation; there is no need to propagate any information; and control returns to step 41. If the calculated value in value stack 62 is different from the previous value in circuit description 13, we replace the previous value with the calculated value in step 43. At step 45, the calculated failure machine value for the failure being simulated and the good machine value are compared. If they are equal, the failure machine cannot be distinguished from the good machine and control is transferred to steps 47 and 48 to remove the block from the failure partition by turning off its *fp* flag if it is on. If the failure machine value does not equal the good machine value, control is transferred to step 46 in which the failure propagating flag *fp* for the calculated block is turned on, and *fs* and *fi* flags are turned off, and logic blocks fed by the calculated block are placed in the next stack for calculation during the next pass through the stacks. Control is then returned to step 41.

In step 47, a check is made to determine if the block has previously been a failure propagating block. If it was not, then the blocks it feeds are not part of the failure partition because of the block's past status; and there is no need to propagate any further the effects of this change. Thus, control is returned to step 41. If the block has previously been a propagating block, it has ceased to be one because it has returned to the good machine value. Thus, its failure propagating flag *fp* is turned off in step 48, and the blocks fed by this block are put in the next stack 60 or 61 in order that, at the next time interval, these blocks may be calculated and any flags that were set because of the present (just calculated) block's past status may be corrected. Control is then returned to step 41.

When all calculated blocks have been updated, step 41 passes control to step 50 to read additional AET to determine if any comparisons of primary output values with expected values are required. If they are, we make a comparison to determine if a failure has been detected in step 52, i.e. determine if the failure being simulated has caused a primary output value to be different from an expected good machine value. If a failure is detected, step 53 produces output to failure data 16 identifying the failure, the time at which it was detected, the erroneous values it caused and the primary outputs. Control is returned to step 21 after housekeeping is achieved in step 51.

The process continues until the failure being simulated has been detected, at which point we return to the beginning of the fault simulation cycle to get another failure or continues until all of the AET has been processed for the selected failure. If the failure is not detected during simulation, this fact is recorded in failure data 16 at the end of the fault simulation; and control is returned to the beginning of the fault simulation cycle.

FIG. 5 shows a logic circuit having primary input blocks A–E and logic blocks 1–5. The outputs of AND blocks 1–3 form inputs to OR block 4, the output of which forms one input to AND block 5. The output of block 4 also forms one input to block 3 whereby blocks 3 and 4 form a DC latch. Primary inputs A and B are inputs to block 1. Primary inputs B and C provide inputs to block 2. The primary input block D forms a second input to block 3. Primary input block E forms a second input to the logic block 5. As seen above, the circuit description 13 of FIG. 2 is a list structure of the circuit of FIG. 5.

FIG. 6 is a chart showing the status of the block values and flags during (or at the end of) each time period T0–T12 of a fault simulation of the circuit of FIG. 5 (described in list 13 of FIG. 2) under control of AET 14 of FIG. 3 using the algorithm of FIG. 4.

The failure activity determination technique is illustrated in the preferred embodiment in a three-valued, unit-delay simulation system. The simulator operates in a time framework that assigns one level of delay to each logic circuit. Changes in values and flags are propagated one level at a time during the significant events simulation. The third-value X is used to represent unknown initial conditions or primary input status. The following brief description of the example given in FIGS. 5 and 6 illustrates the operation of the failure activity determination technique in the three-value, unit-delay system. A more detailed description will follow thereafter.

At time To, all circuit values are unknown (at X). Block 1 is flagged as an fs block (because of the input failure), and primary inputs A and B are flagged as fi blocks (because they fed block 1).

At T1, the primary inputs are all set to logical 0 by AET 14. The effects of this change propagate until T3, when the circuit stabilizes. Because block 1 changes in the same manner as the good machine, the failure value does not propagate and the block flags are unchanged to T3. At T4, primary inputs B and D are set to logical 1. This allows the effect of the input failure to block 1 (an erroneous logical 1 level) to propagate through block 1, block 4, and block 3. At T7, this propagation is completed. Blocks 1, 4 and 3 have become *fp* blocks (because the output values of the blocks are different from the good machine values), and block 5 has become an fs block. Primary input D, primary input E, and block 2 have become *fi* blocks (because the new *fp* and *fs* blocks are fed by them). At T8, primary input E is set to logical 1, and primary input B is set at logical 0. The change in primary input E allows the failure data to propagate to the circuit primary output, and block 5 becomes an fp block. The change in primary input B causes block 1 to revert to good machine status, and it becomes an *fi* and an *fs* block (it is both sensitive to a failure level and an input to a block that is sensitive to a failure level). At T10, primary input D and primary input E are returned to 0. The resulting propagation removes the failure effects from most of the circuit (in particular, the feedback loop between block 4 and block 3 is reset). The final flag status of the circuit is essentially identical to the initial status (some *fi* flags remain that will be removed the next time the respective blocks are updated from the AET). In this example, all changes have been allowed to propagate to stability prior to each set of AET input changes to simplify the operation. The simulator does not require circuit stability between input changes.

The failure activity determination algorithm described earlier with respect to the flowchart of FIG. 4 will now be applied in detail to the example of FIG. 5. Particular reference is directed to the logic circuit of FIG. 5, its circuit description 13 in FIG. 2, the AET 14 of FIG. 3, the block status chart of FIG. 6, and the stack status chart of FIG. 7.

The failure machine value and flag status of each block 1–5 and of each primary input block A–E inclusive is shown in a respective row of FIG. 6. The time periods T0 to T13 inclusive of FIG. 6 represent unit logic delays. The AET 14 is illustrated for making one series of tests on the circuit of FIG. 5 for the particular failure (S–*a*–1) at the input of AND block 1. This particular failure is a shorted input lead on the AND block 1 which causes a logical 1 value to be applied to the input to the logic block 1 irrespective of the value of the primary input A.

At time T0, the failure to be simulated is read from the failure list 15 and is entered into the area 15a of main store 17 in FIG. 1a. The logic block 1 has a failure sensitivity flag fs turned on in its circuit description 13 (FIG. 2) at main storage location 13*a*. The processor 18 is then controlled to turn on the fi flag in circuit description 13 at location 13*a* of each primary input block A and B because they feed the *fs* block 1. The logical value X is entered into the appropriate value positions of blocks 1–5 and A-E inclusive in the description 13. These values are entered into both the good and failing machine value positions. These entries are illustrated in the first column T0 of FIG. 6.

Control is then transferred to the fault simulator routine illustrated in the flowchart of FIG. 4. At time T0, there is no AET entry; therefore, control passes from step 21 to step 29 to increment the time to T1. There are no blocks to be calculated; and therefore, control passes from step 29 to step 21 via steps 31, 41, 50 and 51.

The first stimulus or entry for time T1, illustrated in AET 14 of FIG. 3, is read into main store 17 and is processed by steps 21–28. Step 22 causes the first entry to be read into main store; and since it is neither an fs nor an fp block, step 23 transfers control to step 24 wherein the good and failure machine values for the logic input block A are changed from the unknown value X to a logical 0. In step 25, it is determined that the entry is an fi block transferring control to step 26 wherein it is determined that the input block feeds fs block 1 transferring control to step 28. In step 28, the circuit location data of block 1 is duplicated in the next stack 60 after which control is returned to step 21. Step 21 transfers control to step 22 because it is not the end of the AET entries for time T1. Therefore, in step 22, the next AET entry is read into main store; and in step 23, it is determined that it is neither an *fs* nor an *fp* block transferring control to step 24 wherein the good and failure machine values for input block B are changed from the unknown value X to logical value 0. In step 25, it is determined that it is an fi block; and in step 26, it is determined that it feeds the fs block 1; therefore, block 1 is again stored in the next stack 60. (This second entry of block 1 can be avoided in the simulation if an indicator is turned on the first time the block is stored and turned off when it is calculated.) Control returns to step 21 wherein it is determined that this is not the end of the AET entries for time T1 causing step 22 to read in the third stimulus (to input block C). In step 23, it is determined that the entry applies to neither an fs nor fp block whereby step 24 causes the good and failure machine value in circuit description 13 to be updated from logical X to logical 0. In step 25, it is determined that block C is not an fi block causing control to be returned to step 21. In a similar manner, the fourth and fifth entries for the AET 14 time 1 are read in and processed causing their good and failure machine values to be changed from X to logical 0, as illustrated in FIG. 6. When the last of the AET entries for time 1 have been read and control transferred back to step 21, control is then transferred to step 29 to increment the time from T1 to T2. At the same time, the next stack 60 is changed to the role of a calculate stack, and the calculate stack 61 is changed to the role of a next stack. The function of these stacks will now be described in a little more detail. Each of stacks 60 and 61 can be a calculate stack or a next stack depending upon the function which it is to perform during any time period. When it is a calculate stack, the values of the blocks stored in the stack will be calculated by the routines in FIG. 4, particularly step 32. When it is used as a next stack, for example, in step 28, step 48 and step 46, it is the area into which the circuit location data is transferred from the circuit description 13 for calculation during a next succeeding time period. Thus, each time that step 29 is effective for incrementing the time by 1, one of the stacks 60 or 61 will be changed from a next stack to a calculate stack and the other will be changed from a calculate stack to a next stack. The function of the value stack 62 is temporary storage for good and failure machine values while calculations are being made and until updating of those calculations can be effected where required. Thus, during time T1 as described above, stack 60 is the next stack into which block 1 data is entered during step 28, and stack 61 is the calculate stack. And, as described above, in step 29, the role of stack 60 now becomes a calculate stack, and the role of stack 61 becomes a next stack.

When step 29 increments the time to T2, it transfers control to step 31 wherein it is determined that the end of calculations had not been reached since block 1 data is in the calculate stack 60. Control is transferred to step 32 where both the good and failure machine values are calculated for block 1. The values are saved by storing in the value stack 62. Control is transferred to step 33 wherein it is determined that block 1 is fed by the failure whereby control is transferred to step 34 to turn on the fs flag for block 1 and *fi* flags for blocks A and B. Control is then transferred to step 31. Although no provision is made in the embodiment of FIG. 4, normally block 1 would not be recalculated again since it has been stored twice in the calculate stack 60. However, in the preferred embodiment, it will be assumed that control is again transferred from step 31 to step 32, then to step 33, and returned to step 31 again. At this time, it is determined that the calculations have been ended since there are no further values in the calculate stack 60, and control is transferred to step 41. In step 41, it is determined that the calculations have not yet been updated causing control to be transferred to step 42 wherein both the good and failing machine values are checked against their previous values in the circuit description 13. Since block 1 had been calculated to be a 0 and its previous value was an X, its value is updated to logical 0 in circuit description 13. This occurs at step 43. In step 45, it is determined that the failure machine value of logical 0 is the same as the good machine value since in neither event does the failure propagate through the logic block 1. Therefore, control is transferred from step 45 to step 47 wherein it is determined that block 1 is not an fp block causing control to be returned to step 41. Since block 1 is the only block which was calculated and therefore requiring update, control is transferred from step 41 to step 21 by way of steps 50 and 51.

The first stimulus or entry for time 2 on the AET 14 is read in at step 22. Since its block 1 is an fs block and does not therefore get updated, control is transferred from step 23 to step 21 wherein it is determined that the end of the AET for time T2 has not been reached. In step 22, the second entry with respect to block 2 is read into main store, and it is determined that it is neither an *fs* nor *fp* block in step 23, and therefore, its good and failure machine values are updated in step 24 from an unknown X condition to a logical 0 condition. Control is transferred to step 25 wherein it is determined that the block is not an *fi* block causing control to be returned to step 21. Step 22 causes the third entry with respect to block 3 to be read in; and in the manner described above, its good and failure machine values are updated in step 24; and finally, the last entry for block 5 is read in, and its good and failure machine values are updated. Control is then returned to step 21. Since the end of AET for time T2 has been reached, control has been transferred to step 29 wherein roles of stacks 60 and 61 are changed, and the time is incremented to T3. Since there are no calculations or updates to be made, control is returned again to step 21 via steps 31, 41, 50 and 51. At step 21, it is determined that the end of AET for time T3 has not been reached causing step 22 to read the input entry for block 4 into main store wherein at step 23 it is determined that it is neither an *fs* nor an *fp* block causing updating of its good and failure machine values from X to logical 0 in step 24. In step 25, it is determined that it is not an fi block causing control to be returned to step 21. In step 21, it is determined that the end of AET for time T3 has been reached causing control to be transferred to step 29 wherein the roles of stack 60 and 61 are again changed, and the time is incremented to T4. Again, there are no calculations or updates to be made causing control to be transferred to step 21 via steps 31, 41, 50 and 51. In step 21, it is determined that there are AET entries for time T4 transferring control to step 22 wherein the first entry for block B is transferred from the AET 14 to main store. In step 23, it is determined that input block B is neither an *fs* nor an *fp* block causing updating of its good and failure machine values in step 24 from logical 0 to logical 1. In step 25, it is determined that input block B is an fi block causing transfer of control to step 26 wherein it is determined that block B feeds the *fs* block 1. Therefore, in step 28, the fs block 1 is again entered into the next stack.

Control is then returned to step 21 which in turn transfers control to step 22 for reading the next good machine entry from the AET 14. Since block D is neither an *fs* nor an *fp* block, step 23 transfers control to step 24 to update the good and failure machine values of block D to a logical 1 condition. In step 25, it is determined that block D is not an *fi* block; and therefore, control is transferred to step 21 wherein it is determined that this is the end of the AET entries for time T4. Control is transferred to step 29 to increment the time to T5; the roles of stacks 60, 61 are changed; and control is passed to step 31 wherein it is determined that the end of calculations has not been reached since the fs block 1 is in the calculate stack 61.

Step 32 causes both the good and failure machine values for block 1 to be calculated; those values are transferred to and saved in the value stack 62; and the *fs* flag of block 1 is turned off. Since the good machine input values to block 1 are a logical 0 and 1, respectively, on primary input blocks A and B, the good machine value for block 1 will be calculated as a 0. However, since the primary input A for block 1 has a logical 1 short (fault) applied to the input, step 32 will calculate the failing machine value of block 1 to be a logical 1.

Step 33 determines that block 1 is fed by the failure, causing step 34 to turn on the *fs* flag of block 1 and the *fi* flags of inputs A and B (although already on). Control is transferred to step 31 where it is determined that the end of calculations have been reached. Control is therefore transferred to step 41 where it is determined that the end of updating the calculations has not been completed causing transfer of control to step 42. In step 42, it is determined that the calculated failure value in the value stack 62 is not equal to the old block 1 value in the circuit description 13. Control is therefore transferred to step 43 which causes the calculated value for block 1 to replace the old block 1 value in circuit description 13. Control is then transferred to step 45 wherein it is determined that the failure machine value for block 1 does not equal the good machine value for the block causing control to be transferred to step 46. In step 46, the *fp* flag in the circuit description 13 for block 1 is turned on, the *fs* flag is turned off, and the block which it feeds, block 4, is put in the next stack 60. Control is then transferred to step 41 where it is determined that the update of calculations has been completed.

Control is transferred from step 41 to step 29 by way of steps 50, 51 and 21 for incrementing the time from T5 to T6 and to change the functions of stacks 60, 61. Control is transferred to step 31. Block 4 is in the stack 60 which has been changed from a next to a calculate stack when the time was incremented during step 29. Therefore, step 31 transfer control to step 32 wherein both the good and failure machine values for block 4 are calculated to be logical 0 and 1, respectively, and are saved in the value stack 62. The *fs* flag for block 4 is turned off. In step 33, it is determined that block 4 is fed by an *fp* block 1 causing control to be transferred to step 34 causing the fs flag to be turned back on for block 4 and causing the *fi* flags to be set on for blocks 2 and 3 which feed block 4.

Control is then transferred to step 31 where it is determined that the calculations are complete since block 4 was the only block in the calculate stack 60. Control is then transferred to step 41 where it is determined that updating of the calculations has not been completed causing transfer of control to step 42. During step 42, the calculated values in the value stack 62 are compared with the previous values for block 4. They are determined to be unequal causing control to be transferred to step 43 wherein the newly calculated failing machine and good machine values replace the old values for block 4 in the circuit description 13. Control is then transferred to step 45 where it is determined that the failure machine value does not equal the good machine value causing transfer to step 46. In step 46, the *fp* flag is turned on for block 4, the *fs* flag is turned off, and block 5 and block 3 which are fed by block 4 are placed in the next stack 61.

Control is then transferred to step 41 where it is determined that updating of the calculated values has been completed causing control to be transferred to step 29 by way of steps 50, 51 and 21 to increment the time by 1 to T7 and to change the functions of stacks 60, 61.

Control is transferred from step 29 to step 31 wherein it is determined that the calculations of blocks 3 and 5 in the calculate stack 61 must be made. Control is therefore transferred to step 32 wherein both the good and failure machine values for block 3 are calculated to be logical 0 and 1, respectively, and are stored in the value stack 62. Control is transferred to step 33 wherein it is determined that block 3 is fed by an fp block 4 causing transfer to step 34 wherein the *fs* flag is turned on for block 3, and the *fi* flag is turned on for input D which feeds block 3.

Control is transferred to step 31 where it is determined that the calculations have not ended therefore causing control to be transferred to step 32. In step 32, the good and failure machine values are calculated for block 5 and are stored in the value stack 62. In step 33, it is determined that the block 5 is fed by *fp* block 4 causing the *fs* flag to be turned on for block 5 and the *fi* flag to be turned on for input E which feeds block 5.

Control is transferred to step 31 wherein it is determined that the calculations have been completed. Control is then transferred to step 41 wherein it is determined that the updates have not been completed causing transfer of control to step 42.

In step 42, the calculated failure machine and good machine values for block 3 are compared with its old values and found to be unequal causing transfer of control to step 43 to update the old values with the new values of logical 1 in circuit description 13.

Control is then transferred to step 45 wherein it is determined that the failure machine value for block 3 is not equal to the good machine value causing transfer to step 46 wherein the fp flag is turned on for block 3 and the *fs* and *fi* flags are turned off. Since block 3 feeds block 4, block 4 is placed in the next stack 60; and control is returned to step 41 where it is determined that updates have not been completed, causing step 42 TO compare the calculated good and failure machine values of block 5 with the respective old values. Since these values are both logical 0, control is returned to step 41.

Since the updates are completed and since there is no AET to be read for time T7, control is transferred to step 29 via steps 50, 51 and 21 to increment the time to T8 and to change the functions of the stacks 60, 61. Control is transferred to step 31 wherein it is determined that block 4 is in the calculate stack 60, and its good and failure machine values are therefore calculated in step 32 to be logical 0 and 1, respectively, and are placed in the value stack 62. The fs flag is turned off for block 4. In step 33, it is determined that block 4 is fed by fp blocks 3 and 1 causing control to be transferred to step 34 to turn on the *fs* flag again for block 4 and turn on the *fi* flag for block 2 (although it is already on).

Control is returned to step 31 wherein it is determined that the calculations have been completed causing transfer of control to step 41. In step 41, it is determined that the updates have not been completed; therefore transferring control to step 42. In step 42, the newly calculated good and failure machine values for block 4 are the same as the old values (logical 0 and 1), and control is therefore transferred to step 41 wherein it is determined that the updates are completed.

Control is then transferred to step 21 via steps 50 and 51. In step 21, it is determined that there are input entries for time T8 in the AET 14.

In step 22, the first entry or stimulus for time 8 is read from the AET 14. In step 23, it is determined that its block B is neither an fs nor an fp block causing transfer of control to step 24 wherein the value for block B in the circuit description 13 is updated from a logical 1 to a logical 0 state. In step 25, it is determined that block B has its *fi* flag on transferring control to step 26 wherein it is determined that block B feeds fp block 1. In step 28, the *fp* block 1 is placed in the next stack 61, and control is returned to step 21 wherein it is determined that the end of the AET for time T8 has not been reached. In step 22, the second stimulus or entry is read from the AET 14; and in step 23, it is determined that the corresponding input block E is neither an *fs* nor fp block passing control to step 24 to update block E from a logical 0 to a logical 1 value. In step 25, it is determined that block E is an fi block transferring control to step 26 wherein it is determined that block E feeds the fs block 5. In step 28, the fs block 5 is placed in the next stack 61. Control is returned to step 21 wherein it is determined that the end of the AET 14 for time T8 has been completed. Control is then transferred to step 29 to increment the time to T9 and to change the function of stacks 60 and 61.

Control is then transferred to step 31 wherein it is determined that calculations must be made for blocks 1 and 5. In step 32, the good and failure machine values for block 1 are calculated to be logical 0 for each, and the *fs* flag is turned off for block 1. Step 33 determines that block 1 is fed by the failure S–*a*–1; and in step 34, the *fs* flag is turned on again for block 1; and *fi* flags are turned on for input blocks A and B (even though they are on). Control is returned to step 31 wherein it is determined that the end of calculations have not been reached transferring control to step 32. In step 32, the good and failure machine values are calculated for block 5 to be logical 0 and logical 1, respectively, and the fs flag is turned off for block 5. In step 33, it is determined that block 5 is fed by *fp* block 4 transferring control to step 34 wherein the fs flag is again turned on for block 5, and the *fi* flag is turned on for block E (even though it is already on).

Control is transferred to step 31 wherein it is determined that the calculations have been completed causing transfer control to step 41. In step 41, it is determined that updates must be made for blocks 1 and 5. In step 42, the good and failure machine values calculated for block 1 are compared with their old values; and the good machine values are found to be equal; but the failure machine values are found to be unequal. Therefore, in step 43, the old logical value of 1 for the failure machine is replaced with the newly calculated logical value 0 for block 1. In step 45, it is determined that the failure machine and the good machine values are equal causing transfer of control to step 47. In step 47, it is determined that block 1 is an *fp* block causing step 48 to turn off the *fp* flag and to place block 4 which is fed by block 1 in the next stack 60.

Control is returned to step 41 wherein it is determined that the updates are not completed. In step 42, the calculated values for the good and failing machine are compared with the old values of block 5. The good machine values are found to be equal while the failing machine values are found to be unequal. In step 43, the old failing machine value for block 5 is therefore replaced with the newly calculated failing machine value. In step 45, the failure machine value for block 5 is found to be not equal to the good machine value causing step 46 to turn on the *fp* flag of the block 5 and turn off the fs flag.

Control is returned to step 41 wherein it is determined that updating has been completed. Control is then transferred to step 29 via steps 50, 51 and 21 to increment the time to T10 and to change the function of stacks 60 and 61. Control is transferred to step 31 wherein it is determined that calculations must be made. In step 32, the good and failure machine values for block 4 are calculated to be logical 0 and logical 1, respectively; and these values are stored in the value stack 62. The fs flag is turned off for block 4. In step 33, it is determined that block 4 is still fed by fp block 3 whereby step 34 causes the *fs* flag to be turned on again for block 4 and fi flags to be turned on for blocks 1 and 2 which are inputs to block 4. Control is then transferred to step 31 wherein it is determined that the calculations have been completed causing control to be transferred to step 41. In step 41, it is determined that updating must be done; and in step 42, the good and failure machine calculated values for block 4 are compared with the respective old values. The respective, calculated and old values are found to be equal to each other returning control to step 41 wherein it is determined that updating has been completed. Control is then transferred to step 50 wherein it is determined that the first entry on the AET 14 for time T10 is a compare entry. Control is then transferred to step 52 wherein it is determined that the good and failure machine values for the primary output, that is the output of logic block 5, are not equal therefore indicating the detection of a failure. The failure data is, in step 53, transferred to the failure data 16 as indicated in FIG. 1, and control is transferred to step 21 via step 51.

In step 21, it is determined that the end of the AET entries for time T10 has not been completed, and control is transferred to step 22 wherein the next entry on the AET 14 is read out. It is determined that this entry for input block D is neither an *fs* nor *fp* block; and in step 24, the value of input block D is updated from a logical 1 to a logical 0 condition.

In step 25, it is determined that input block D is an fi block; and in step 26, it is determined that block D feeds fp block 3. Therefore, in step 28, fp block 3 is placed in the next stack 61. Control is returned to step 21 wherein it is determined that the end of the AET 14 for tine T10 has not been completed; and therefore, in step 22, the next and final entry is read from the AET 14. In step 23, it is determined that the corresponding input block E is neither an *fs* nor an *fp* block; and in step 24, the value of the block is updated from logical 1 to logical 0. In step 25, it is determined that block E is an fi block; and in step 26, it is determined that block E feeds the fp block 5. Therefore, in step 28, the *fp* block 5 is placed in the next stack 61.

Control is then returned to step 21 where it is determined that the end of the AET for time T10 has been reached causing transfer control to step 29. In step 29, the time is incremented to T11, and the roles or functions of stacks 60 and 61 are reversed.

Control is transferred to step 31 wherein it is determined that calculations must be made. In step 32, the good and failure machine values for block 3 are calculated to be logical 0 in each instance. These values are saved in value stack 62, and the fs flag is removed from block 3 circuit description. In step 33, it is determined that block 3 is not fed by an *fp* block or by the failure, and control is returned to step 31. In step 31, it is determined that the calculations have not been completed; and in step 32, the good and failure machine values for block 5 are calculated to be logical 0 in both cases; and these values are saved in value stack 62. The fs flag is turned off for block 5 in the circuit description 13; and in step 33, it is determined that block 5 is not fed by an *fp* block or by the failure causing control to be returned to step 31.

In step 31, it is determined that the calculations have been completed causing the transfer of control to step 41. In step 41, it is determined that updates must be done. In step 42, the good and failing machine values calculated for block 3 are compared with their respective old values. The good machine values are found to be equal. However, the failure machine values are found to be unequal. Therefore, in step 43, the newly calculated failure machine value of logical 0 replaces the old failure machine value for block 3 in the circuit description 13. In step 45, it is determined that the failure machine value equals the good machine value. In step 47, it is determined that block 3 is an *fp* block causing the *fp* flag to be turned off in step 48. Since block 3 feeds block 4, block 4 is placed in the next stack 60 during step 48. Control is returned to step 41, wherein it is determined that the updates are not complete. In step 42, the good and failure machine calculated values are compared with their respective old values. The good machine values are found to be equal. However, the failure machine values are found to be unequal. Therefore, in step 43, the newly calculated failure machine value of logical 0 replaces the old failure machine value for block 5 in circuit description 13. In step 45, it is determined that the failure machine value and the good machine value for block 5 are now equal, and control is therefore transferred to step 47. In step 47, it is determined that the block 5 is an *fp* block whereby in step 48 the *fp* flag is turned off for block 5. Control is then transferred to step 41 wherein it is determined that the updating of calculations has been completed. Control is then transferred to step 29 via steps 50, 51 and 21 to increment the time to T12 and to change the functions of stacks 60 and 61.

Control is then transferred to step 31 wherein it is determined that block 4 must be calculated. In step 32, the good and failure machine values are calculated for block 4 and are saved in value stack 62. The fs flag is turned off for block 4. In step 33, it is determined that block 4 is neither fed by an fp block nor by the failure itself causing control to be returned to step 31. In step 31, it is determined that the calculations have been completed, and control is transferred to step 41.

In step 41, it is determined that updating of the calculations for block 4 are not completed. In step 42, the good and failure machine values for block 4 are compared with their respective old values. The good machine values are found to be equal while the newly calculated failure machine value is different from its old value. Therefore, in step 43, the failure machine value for block 4 is replaced by the newly calculated value. In step 45, it is determined that the failure and good machine values are equal causing transfer of control to step 47. In step 47, it is determined that block 4 is an *fp* block; and in step 48, the *fp* flag is turned off. Since block feeds blocks 3 and 5, blocks 3 and 5 are placed in the next stack 61, and control is returned to step 41. Control is transferred to step 29 via steps 50, 51 and 21 to increment the time to T13 and to change the functions of stacks 60 and 61. In step 31, it is determined that calculations must be made for blocks 3 and 5. In step 32, the good and failure machine values for block 3 are calculated and saved in the value stack 3. The *fs* flag is turned off for block 3 in the circuit description. In step 33, it is determined that block 3 is not fed by an *fp* block returning control to step 31. Control then passes to step 32 to calculate the good and failure machine values for block 5. These values are saved in the value stack, and the fs flag for block 5 is turned off. In step 33, it is determined that block 5 is not fed by an *fp* block or by the failure itself, and control is returned to step 31. The calculations have been completed causing transfer of control to step 41 where it is determined that updating of the calculations must be completed. In step 42, it is determined that the good and failure machine calculated values equal their old values causing return of control to step 41. The good and failure machine calculated values are compared with their old values for block 5 and are found to be equal again returning control to step 41.

In a conventional manner, the end-of-file signal on the I–O device carrying the AET will be detected at step 51 indicating the end of the fault simulation. The next failure can then be read in to start the next fault simulation routine after housekeeping and initialization are completed.

This example demonstrates the propagation of the failure partitions. The effectiveness of the failure activity determination technique may be estimated if the logic circuit in the example is considered to be part of a larger circuit. For the example of FIG. 5, 25 good machine logic block calculations were made (an average of five for each logic block). If the sample circuit were part of a ten thousand block partition, approximately 50,000 good machine calculations could be expected for the given time period. When the failure flags are used to determine which blocks must be calculated, fourteen blocks must be calculated in the sample circuit. However, if the sample circuit were part of a ten thousand block partition, none of the logic values of the remaining partition need be calculated because they are not affected by the failure; therefore, the improved fault simulation requires only 14 calculations and 25,000 value updates (one update for every two calculations because only 50 percent of the blocks change value when calculated). A normal fault simulation would require fifty thousand calculations. The potential increase in running speed using the failure activity determination technique fault simulation should be clear.

The preferred embodiment described illustrates the application of the failure activity determination technique to a three-value unit-delay interpretive simulator. It will be appreciated that the technique may be applied to any fault simulation program utilizing an interpretive procedure to schedule calculation (for example, a nominal delay simulator or a zero-delay simulator), irrespective of the procedure used in making calculations.

I claim:

1. A method for determining detectable failure data concerning an electronic logic circuit having a plurality of interconnected logic blocks from which data, maintenance procedures may be established, comprising the steps of preparing a sequence of test patterns on an input-output storage device, executing in a general purpose data processing system a three-valued, unit-delay, interpretive good machine simulation under control of said sequence of test patterns, preparing, on an input-output device, an all events trace which includes an ordered listing of all test patterns and all logical values changes in the logic blocks in the sequence in which they occurred during the good machine simulation, of the time periods at which they occurred and of entries directing comparison of good vs. failure machine values at specified outputs of the circuit being simulated;

preparing a list of failures on an input-output device, storing in the system a circuit description of the circuit inputs, selected outputs, and logic blocks in the system, executing in the system a three-valued, unit-delay, interpretive good and failure machine simulation under control of said all events trace for each failure in the list, the latter simulation including the steps of dynamically determining the failure partition, i.e. those logic blocks affected by the failure at any moment during simulation, dynamically assigning different flags to logic blocks within and outside of the failure partition, dynamically updating, under control of the flags, the values of inputs and logic blocks not in the failure partition incident to all events trace entries, and dynamically calculating, under control of the flags, the values of only those logic blocks in the failure partition incident to all events trace entries and circuit value propagation, periodically comparing good and failure machine values at selected circuit outputs for detection of simulated failures, and storing detected failure data in an input-output device.

2. A method for determining detectable failure data concerning an electronic logic circuit having a plurality of interconnected logic blocks from which data, maintenance procedures may be established, comprising the steps of preparing a sequence of test patterns on an input-output storage device, executing in a general purpose data processing system good machine simulation under control of said sequence of test patterns, preparing, on an input-output device, an all events trace which includes an ordered listing of all test patterns and all logical values changes in the logic blocks in the sequence in which they occurred during the good machine simulation, of the time periods at which they occurred and of entries directing comparison of good vs. failure machine values at specified outputs of the circuit being simulated;

preparing a list of failures on an input-output device, storing in the system a circuit description of the circuit inputs, selected outputs, and logic blocks in the system, executing in the system an at least partially, interpretive good and failure machine simulation under control of said all events trace for each failure in the list, the latter simulation including the steps of dynamically determining the failure partition, i.e. those logic blocks affected by the failure at any moment during simulation, dynamically assigning different flags to logic blocks within and outside of the failure partition, dynamically updating, under control of the flags, the values of inputs and logic blocks not in the failure partition incident to all events trace entries, and dynamically calculating, under control of the flags, the values of only those logic blocks in the failure partition incident to all events trace entries and circuit value propagation, periodically comparing good and failure machine values at selected circuit outputs for detection of simulated failures, and storing detected failure data in an input-output device.

3. A method for determining detectable failure data concerning an electronic logic circuit having a plurality of interconnected logic blocks from which data, maintenance procedures may be established, comprising the steps of preparing a sequence of test patterns, executing a three-valued, unit-delay, interpretive good machine simulation under control of said sequence of test patterns, preparing an all events trace which includes an ordered listing of all test patterns and all logical values changes in the logic blocks in the sequence in which they occurred during the good machine simulation, of the time periods at which they occurred and of entries directing comparison of good vs. failure machine values at specified outputs of the circuit being simulated;

preparing a list of failures, storing a circuit description of the circuit inputs, selected outputs, and logic blocks in the system, executing a three-valued, unit-delay, interpretive good and failure machine simulation under control of said all events trace for each failure in the list, the latter simulation including the steps of dynamically determining the failure partition, i.e. those logic blocks affected by the failure at any moment during simulation, dynamically assigning different flags to logic blocks within and outside of the failure partition, dynamically updating, under control of the flags, the values of inputs and logic blocks not in the failure partition incident to all events trace entries, and dynamically calculating, under control of the flags, the values of only those logic blocks in the failure partition incident to all events trace entries and circuit value propagation, periodically comparing good and failure machine values at selected circuit outputs for detection of simulated failures, and storing detected failure data.

4. In a fault simulation program for simulating digital systems within a processor to predict and document the behavior of the system in the presence of predetermined logic failures for given input test patterns of the type in which a record is made of every input and logic block value change occurring during a simulated non-failing behavior of the system under control of a sequence of test patterns applied thereto, in which input, output and logic block value changes occurring during a simulated good and failing behavior of the system under control of said record and a selected failure are determined, and in which selected outputs are periodically checked for differences between good and failing machine values to detect the selected failures, wherein the determination of the value changes for said simulated good and failing behavior comprises the steps of dynamically determining those logic blocks affected by the selected failure as simulation proceeds, dynamically updating the values of the inputs and logic blocks not affected by the selected failure as simulation proceeds, and dynamically calculating the values of only those logic blocks affected by the selected failure as simulation proceeds.

5. The method set forth in claim 4 wherein the first-mentioned step includes the steps of assigning an *fs* flag to a logic block if a failure value is propagated to the logic block during the simulation but does not pass through it, assigning an *fp* flag if a failure value is propagated through the logic block during the simulation, and assigning an *fi* flag if the block is an input to an *fs* or *fp* block; and wherein the flag assigning steps, the value updating step and the value calculating step include the steps of determining the flags assigned to each block as it is read from the all events trace, updating the good and failing machine values of said each block if it has alternatively no flags or only an *fi* flag assigned thereto, calculating the good and failing machine values of each block having an *fs* or *fp* flag and fed by said updated blocks having *fi* flags, and calculating the good and failing machine values of each block having an *fs* or *fp* flag and fed by said updated blocks having *fi* flags, and calculating the good and failing machine values of each block fed by one of said calculated *fs* or *fp* blocks.

* * * * *